United States Patent [19]

Ostroff et al.

[11] 4,024,220

[45] May 17, 1977

[54] FLUE GAS SCRUBBING AND CONVERSION OF CALCIUM SULFITE TO CALCIUM SULFATE

[75] Inventors: Norman Ostroff, Stamford; Nurhan E. Takvoryan, Norwalk, both of Conn.

[73] Assignee: UOP Inc., Des Plaines, Ill.

[22] Filed: Aug. 25, 1975

[21] Appl. No.: 607,310

[52] U.S. Cl. .................... 423/242; 423/166

[51] Int. Cl.² .................. C01B 17/00; C01F 11/46; C01F 1/00

[58] Field of Search .................. 423/242–244, 423/555, 166

[56] References Cited

UNITED STATES PATENTS

| | | | |
|---|---|---|---|
| 2,926,999 | 3/1960 | Tarbutton et al. | 423/242 |
| 3,556,722 | 1/1971 | Owaki | 423/242 |
| 3,840,638 | 10/1974 | Morita et al. | 423/242 |

*Primary Examiner*—O. R. Vertiz
*Assistant Examiner*—Gregory A. Heller
*Attorney, Agent, or Firm*—James R. Hoatson, Jr.; Philip T. Liggett; William H. Page, II

[57] ABSTRACT

In the scrubbing of sulfur compound containing stack gases, there is an advantage to converting calcium sulfite to calcium sulfate downstream from the scrubber in order to provide for smaller sludge handling equipment and to form a more usable sludge. Thus, in the present operation, there is provided an ozonation of the withdrawn scrubber bottoms slurry to effect the conversion of calcium sulfite in such slurry to calcium sulfate.

2 Claims, 1 Drawing Figure

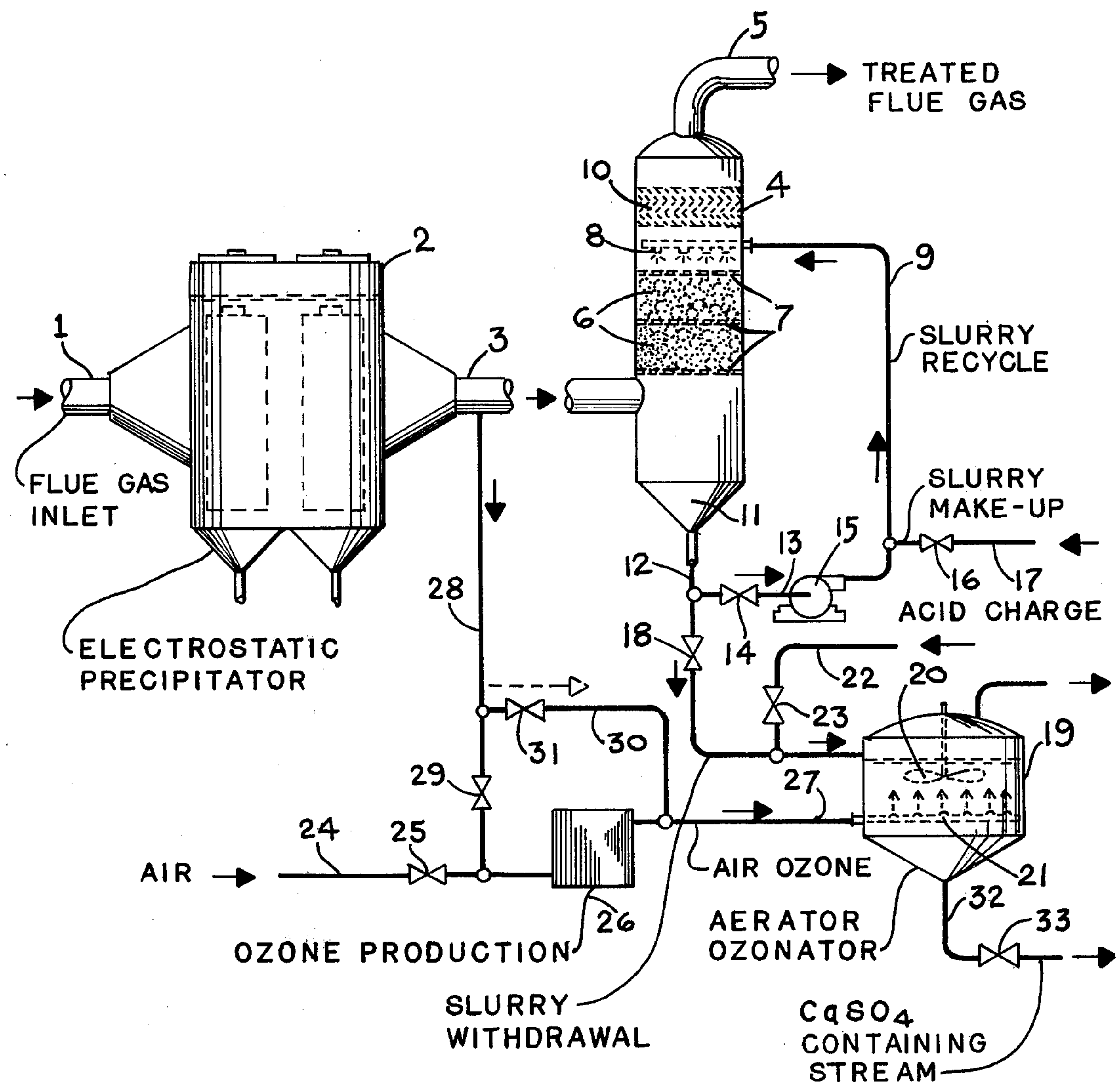
5
TREATED FLUE GAS
10
4
8
2
9
1
6
7
3
SLURRY RECYCLE
FLUE GAS INLET
SLURRY MAKE-UP
11
13
15
12
16
17
28
ACID CHARGE
14
ELECTROSTATIC PRECIPITATOR
18
22
20
23
19
31
30
29
27
24
25
AIR
AIR OZONE
21
32
33
26
AERATOR OZONATOR
OZONE PRODUCTION
SLURRY WITHDRAWAL
CaSO4 CONTAINING STREAM

FLUE GAS SCRUBBING AND CONVERSION OF CALCIUM SULFITE TO CALCIUM SULFATE

The present invention relates to an improved system which provides for the use of ozone to effect the oxidation of calcium sulfite ($CaSO_3$) to calcium sulfate ($CaSO_4$) in the withdrawn bottoms from lime and/or limestone slurry scrubbing operations for sulfur compound containing stack gases.

More particularly, the invention is directed to providing a system which includes means to form an ozone-air stream to pass to an agitated slurry aerator-ozonation zone where there is effected the enhanced, more rapid oxidation of calcium sulfite to calcium sulfate.

BACKGROUND OF THE INVENTION

It is well known and realized that sulfur oxides provide atmospheric pollution and that coals, as well as oils and gaseous fuels, contain sulfur compounds such that as the fuels are burned there is sulfur dioxide ($SO_2$) and some sulfur trioxide ($SO_3$) as resulting gaseous products of combustion in the stack gases. It is also known that different types of stack gas treating operations have been tried and are being used with varying degrees of success. In any event, it appears that one of the least expensive, and quite efficient processes, for treating effluent gases involves the use of lime and/or limestone powder in an aqueous slurry to scrub the gas stream and effect a removal of a major portion of the $SO_2$—$SO_3$ components. The scrubber system is also of advantage in being able to remove any fly ash that may be remaining in the effluent stream reaching the scrubber zone after passage through an electrical precipitator or through a centrifugal type separator system. There are, in addition, certain sulfur compound removal systems which can involve a conversion of the compounds to sulfur and the recovery of substantially pure sulfur; however, such process systems can be quite complex and expensive.

In any case, although lime and ground limestone can be relatively cheap treating materials in comparison to most chemicals and reagents, it is realized that it is of advantage to minimize the amounts to be used and to be "thrown away", as well as of advantage to minimize the sludge concentrating equipment and the handling problems with respect to withdrawn materials. Thus, it may be considered a particular object of the present invention to obtain a more readily precipitatable material and/or a more usable material by effecting a conversion of calcium sulfite in the scrubber bottoms to calcium sulfate.

It is also an object of the present invention to provide a system which utilizes ozone to speed up and enhance the conversion of calcium sulfite to calcium sulfate.

In a corollary aspect, it is an object of the invention to improve the settling characteristics of the withdrawn slurry-sludge material by conversion of the $CaSO_3$ to $CaSO_4$ and permit smaller sludge handling equipment than would otherwise be required. Still further, it is actually contemplated that recovered $CaSO_4$ may be converted to gypsum ($CaSO_4.2H_2O$) to be sold as a useful material of construction and/or that it can more easily be stabilized to a relatively hard material for use as landfill.

In one embodiment, the present invention provides a method for effecting the calcium slurry scrubbing and desulfurizing of a sulfur-containing flue gas stream in a manner to minimize the bulk of resulting calcium-sulfur compounds, which comprises the steps of: (a) substantially removing entrained particulates from the flue gas stream, (b) passing the resulting stream to a scrubbing zone and effecting the contacting thereof with an aqueous slurry containing a calcium source, (c) discharging a resulting scrubbed flue gas stream with reduced sulfur content from said scrubbing zone, (d) also withdrawing from said scrubbing zone at least a part of the bottoms slurry containing resulting calcium sulfite and passing such calcium sulfite-containing slurry to a separate ozonation zone, (e) passing an ozone containing gaseous stream into contact with the slurry material in the ozonation zone to effect a conversion of a major portion of the calcium sulfite in the bottoms slurry to calcium sulfate, and (f) withdrawing a resulting calcium sulfate-containing sludge from said ozonation zone.

In another embodiment, the present invention provides in combination with a system having a scrubber means for scrubbing stack gases with a calcium-containing aqueous slurry to remove entrained sulfur compounds, the improved apparatus system which comprises: (a) means for withdrawing a controlled flow of calcium sulfite-containing bottoms slurry from the scrubber means and discharging such slurry into an aerator-ozonator chamber, (b) converter means for producing an ozone-containing stream, (c) conduit means for passing said ozone-containing stream to said aerator-ozonator chamber, (d) gas distributor means connective with said chamber to distribute the ozone-containing stream upwardly through the latter and into contact with the slurry stream also being charged to said chamber, and (e) additional conduit means to withdraw a resulting slurry stream containing calcium sulfate from said aerator-ozonator chamber.

In connection with the scrubbing of the stack gas stream with lime and/or powdered limestone slurry, it is to be realized that powdered limestone may contain some magnesium carbonate and also that there may be utilized powdered dolomite which will contain better than 5% of magnesium carbonate in combination with the calcium carbonate. Thus, in addition to resulting calcium sulfite in the drawn slurry bottoms stream from the scrubbing zone, there may be some magnesium sulfite formed from the scrubbing operation. It should also be pointed out that there may be some portion of calcium bisulfite present in the slurry stream and that the terminology of a "calcium sulfite-containing stream" is used in the broad sense to the extent that it is believed that most of the sulfur-containing ions will be present in the form of calcium sulfite.

Typically, in connection with the present improved system, there will also be the addition of sulfuric acid or other acidic medium to provide a low pH in the withdrawn slurry stream in order to enhance the oxidation reaction to form calcium sulfate. In other words, sulfuric acid will be added to the withdrawn slurry ahead of aerator-ozonator zone, or to such zone, such that there is a low pH condition in the conversion zone. Actually, various acidic mediums may be utilized to lower the pH of the slurry stream; however, sulfuric acid is preferable in order to preclude adding other than sulfate ions into the solution.

With regard to the ozone-containing stream which is to be charged into the aerator-ozonator zone, it is not intended to limit the present invention to any one method or means for preparing ozone inasmuch as it is contemplated that the ozone will be prepared in a conventional commercial manner. For example, ozone may be produced by the electronic irradiation of air or oxygen. Also, ozone may be formed by the passage of air or oxygen through an ultraviolet light source. Premanufactured ozone may be shipped to the ozonation cite; however, typically, ozone is manufactured adjacent the site where it is to be utilized by a conventional ozone production means and the problems of ozone shipment eliminated.

Most stack gas treating systems which incorporate flue gas scrubbing will also make use of an electrostatic precipitator to remove fly ash ahead of the scrubbing step and as a result there is a minimum of fly ash material within the typical countercurrent scrubbing operation. In view of this type of typical system, it is also within the scope of the present invention to utilize at least a portion of the gas stream which has passed through an electrostatic precipitator for fly ash removal inasmuch as ozone is produced in the precipitator and such electric discharge treated stream may well be utilized to pass through the ozone producing unit or optionally be utilized as is to combine with ozone being separately produced and then flow in a combined stream to the aerator-ozonator zone. It is not intended to limit the present invention to requiring that any given quantity of ozone shall be present in the aerating stream; however, since it is recognized that ozone is a more powerful oxidizing agent than oxygen, it will be desirable to have as much ozone present in the oxidizing stream as is economically feasible from the ozone producing equipment.

Reference to the accompanying drawing and the following description thereof will serve to illustrate one embodiment of the present invention as well as provide for indicating alternative operations and advantages which may be obtained in the system for converting calcium sulfite in the slurry withdrawal to calcium sulfate.

Referring now to the diagrammatic drawing, there is indicated a flue gas line 1 discharging into an electroprecipitator 2 in order to effect the removal of a major portion of entrained fly ash or other particulates. The substantially particle free flue gas stream then passes by way of duct 3 into a vertically oriented scrubber 4 where there is diagrammatically indicated that there will be an upflow of the gas stream countercurrent to a downward scrubbing liquor flow such that a substantially particle free and sulfur free treated gas stream can be discharged by way of outlet conduit 5.

More particularly, the scrubbing chamber 4 which is illustrated in the present diagrammatic drawing provides a plurality of contact stages at 6 which are defined by perforate grid plates 7 such that there is an upflow of the gaseous stream in the presence of mobile contact elements being maintained in the zones 6. The gaseous stream, as well as the mobile elements in the contact zones, will be wetted by slurry distributed from spray means at 8 in turn receiving recycled slurry liquor from line 9. The scrubbed gases then pass through mist extracting means 10 to reach the discharge outlet conduit 5, while at the lower end of the scrubber column 4 there is the collection of slurry liquid in a lower pool 11. This aqueous slurry will comprise calcium ions from lime or powdered limestone, dolomite, etc., together with calcium sulfite, calcium bisulfite, magnesium sulfite, etc., by reason of the calcium reacting with the sulfur compounds in the stack gas stream. In accordance with a typical scrubbing operation for stack gases, there will be a withdrawal of slurry from the lower end of the chamber 4 by way of line 12 and a recycle of a portion of this slurry by way of line 13 having valve 14 and the pump means 15 which discharges into line 9 in turn connecting with the spray means or distributor means 8 within the upper portion of the column 4. There is also indicated means to provide for slurry make-up comprising an aqueous solution of powdered limestone or lime, etc., which can be introduced by way of line 16 with control valve 17 into recycle line 9.

In accordance with the present invention, a portion of slurry withdrawal is continuously made, or at least periodically made, by way of line 12 through control valve 18 such that there is the means for withdrawing the sulfur compounds from the system. Also, in accordance with the present arrangement, the slurry withdrawal from line 12 carries to an aerator-ozonator chamber 19 for further treatment. The latter is indicated as being of an agitated type of chamber with paddle wheel means 20 provided to maintain movement of the slurry within the contact zone. Chamber 19 also indicates the utilization of a multiple outlet ozone distributor means at 21 to effect the discharge of an air-ozone mixture into the reaction chamber 19 so as to effect an efficient reaction of calcium sulfite to calcium sulfate. It is, of course, to be understood that the present drawing is diagrammatic and that many forms of stirred chambers or agitation arrangements may be utilized in effecting the contact between the ozone-containing stream and the calcium sulfite-containing stream.

As heretofore noted, it is a particular advantage to maintain a low pH in the aerator-ozonator conversion zone 19 and as a result there is indicated provision for introducing acid by way of line 22 and valve 23 into line 12 which discharges into chamber 19. Also, as heretofore indicated, it is preferred that sulfuric acid ($H_2SO_4$) be utilized as the acidic medium for this type of operation in order to preclude introducing other than sulfate ions into the reaction.

In accordance with the present embodiment, air is indicated as being introduced by way of line 24 and valve 25 into an ozone producing zone 26 and an air-ozone stream is discharged into conduit 27 for introduction to the distributor means 21 within the lower portion of the ozonator chamber 19. However, where an electrostatic precipitator, such as at 2, is being utilized in combination with the scrubbing means to treat the flue gas stream, it is also within the scope of the present invention to make provision for utilizing a portion of the discharged gases from the precipitator 2, and the ozone content therein, as a partial source of ozone within the system. For example, a portion of the electrostatic precipitator discharge may be withdrawn by way of line 28 and passed by way of control valve 29 into line 24 ahead of ozone production zone 26 or, alternatively, there may be flow of an ozone-containing stream by way of lines 28 and 30, through control valve 31, into the ozone charge line 27 and then into the ozonator chamber 19. As still another alternative, there may be a separate compartment within the electrostatic precipitator chamber 2 where a particle free air stream may be subjected to electrical charge to form an ozone-containing stream and this stream passed to the ozonator chamber 19. In other words, the ozone producing section 26 could be combined into or integrated with the electrostatic precipitator chamber 2 to provide for ozone production and the separate chamber 26 eliminated.

In any event, the aerator-ozonator chamber at 19 shall be provided with a sufficient air-ozone stream, along with means for agitation to substantially convert most of the calcium sulfite-calcium bisulfite present into the desired calcium sulfate. Calcium sulfate is indicated as being withdrawn from the lower portion of chamber 19 by way of line 32 and valve 33 for discharge to further handling equipment. As heretofore noted, the calcium sulfate is more readily settled or precipitated than is the calcium sulfite and as a result will require less handling equipment than would otherwise be needed. The actual nature of the sulfate collection and removal equipment will depend upon the desired form of the material which is to be disposed of. For example, calcium sulfate may be salable as gypsum and there can be suitable hydrating equipment provided as part of the downstream handling stages to effect a conversion to the salable gypsum form. On the other hand, where the calcium sulfate is merely to be disposed of as landfill, or as an additive to the other bulk materials, there may be suitable drying and compacting equipment.

It will be obvious to those skilled in designing stack gas treating operations and systems that the present drawing is diagrammatic and that there may be various modifications with respect to the treating system as well as to the types of apparatus being involved in the system. It is, however, a feature of the invention to provide for the supply of ozone and its introduction into suitable conversion means such that there is a rapid efficient conversion of calcium sulfite in the withdrawn slurry so as to speed up and improve its conversion to calcium sulfate and thus minimize the sludge handling equipment downstream from the scrubber portion of a stack gas treating system. Also, as heretofore set forth, it is not intended to limit the present invention to any one source of ozone for introduction into the aerator-ozonator zone of the system.

We claim as our invention:

1. A method for effecting the calcium slurry scrubbing and desulfurizing of a sulfur-containing flue gas stream in a manner to minimize the bulk of resulting calcium-sulfur compounds, which comprises the steps of:

a. substantially removing extrained particulates from the flue gas stream by an electrostatic preciptator means,
b. passing the resulting stream to a scrubbing zone and effecting the contacting thereof with an aqueous slurry containing a calcium source,
c. discharging a resulting scrubbed flue gas stream with reduced sulfur content from said scrubbing zone,
d. also withdrawing from said scrubbing zone at least a part of the bottom slurry containing resulting calcium sulfite, combining an acid with said bottoms slurry to provide a low pH for said slurry, and passing such clacium sulfite-containing slurry to a separate ozonation zone,
e. passing an ozone-containing gaseous stream into contact with the slurry material in said ozonation zone to effect a conversion of a major portion of the calcium sulfite in the bottoms slurry to calcium sulfate, at least a portion of the ozone-containing gaseous stream being passed to said ozonation zone being received from an ozone-containing stream discharged from said electrostatic precipitator means, and
f. withdrawing a resulting calcium sulfate-containing sludge from said ozonation zone.

2. The method of claim 1 still further characterized in that said acid introduced into the bottoms slurry stream is sulfuric acid.

* * * * *